United States Patent [19]

Ilardo

[11] Patent Number: 4,567,214
[45] Date of Patent: Jan. 28, 1986

[54] FLAME RETARDANT POLYOLEFIN COMPOSITIONS

[75] Inventor: Charles S. Ilardo, Tonawanda, N.Y.

[73] Assignee: Occidental Chemical Corporation, Niagara Falls, N.Y.

[21] Appl. No.: 650,482

[22] Filed: Sep. 14, 1984

[51] Int. Cl.$^4$ ............................................. C08K 3/10
[52] U.S. Cl. ................................... 523/216; 524/176; 524/411
[58] Field of Search ................. 524/176, 411; 523/216

[56] References Cited

U.S. PATENT DOCUMENTS

| | | | |
|---|---|---|---|
| 3,418,263 | 12/1968 | Hindersinn et al. | 524/411 |
| 3,900,533 | 8/1975 | Krackeler et al. | 524/411 |
| 4,079,033 | 3/1978 | Oswitch et al. | 524/398 |
| 4,098,761 | 7/1978 | Maul et al. | 524/411 |
| 4,169,082 | 9/1979 | Kusterer | 428/441 |
| 4,194,072 | 3/1980 | Chang et al. | 525/432 |
| 4,234,469 | 11/1980 | Ohta et al. | 524/411 |
| 4,243,579 | 1/1981 | Keogh | 106/15.05 |
| 4,259,230 | 3/1981 | Simons | 524/411 |

FOREIGN PATENT DOCUMENTS 49-119942 11/1974 Japan .

Primary Examiner—Lewis T. Jacobs
Attorney, Agent, or Firm—James F. Tao; A. S. Cookfair

[57] ABSTRACT

Flame retardant polyolefin compositions having improved smoke suppressant properties comprise
(1) a polyolefin,
(2) a compound of iron,
(3) a compound of antimony,
(4) a non-basic compound of magnesium, and
(5) a chlorinated organic compound of the formula

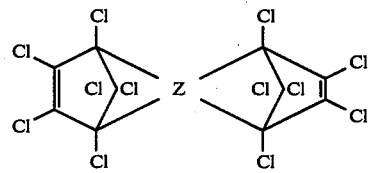

wherein Z is a tetravalent saturated cyclic radical having at least 4 carbon atoms which may be substituted by chlorine, bromine, fluorine or alkyl of 1 to 6 carbon atoms.

24 Claims, No Drawings

FLAME RETARDANT POLYOLEFIN COMPOSITIONS

BACKGROUND OF THE INVENTION

This is a continuation-in-part of application Ser. No. 574,835, filed Jan. 30, 1984, now abandoned.

This invention relates to flame retardant polyolefin compositions, having improved smoke retardant charcteristics.

Polyolefin compositions are employed in a diversity of applications, including, for example, wire coatings, pipes, conduits, transportation products, marine products, fibers, coatings, industrial moldings, and various other products. These and other uses are often served better by polyolefin compositions that are flame retardant.

However, flame retardance as characterized, for example, by low burning rates, is only one of a number of fire-related hazards that may be exhibited by a given material. In recent years, the hazards associated with smoke generation during fires have been the subject of considerable concern, with the result that a need exists for polyolefin compositions that are not only flame retardant, but are resistant to smoke generation as well.

Accordingly, it is an object of this invention to provide flame retardant polyolefin compositions that not only have low burning rates, but also exhibit low smoke generation when in contact with flame.

SUMMARY OF THE INVENTION

In accordance with this invention, flame retardant polyolefin compositions having improved smoke suppressant properties comprise (1) a polyolefin polymer, (2) a compound of iron, (3) a compound of antimony, (4) a compound of magnesium, and (5) a chlorinated organic compound of the formula

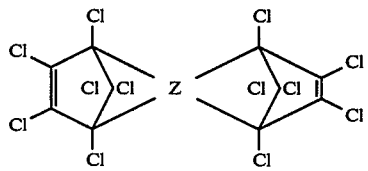

where Z is a tetravalent saturated cyclic radical having at least 4 carbon atoms which may be substituted by chlorine, bromine, fluorine or alkyl of 1 to 6 carbon atoms.

The polyolefin polymers employed in the flame retardant, low smoke compositions and coatings of this invention include high molecular weight polymers and resins as well as the intermediate molecular weight materials utilized for coatings and paints. The polymers embraced within the scope of this invention include, for example, the homopolymers, copolymers, and terpolymers of unsaturated aliphatic hydrocarbons such as ethylene, propylene, and butylene and the like as well as mixtures thereof. The preferred polyolefins are the polymers and copolymers of ethylene. In the flame retardant polymer compositions of this invention the polyolefin component will typically be present in an amount of about 25 to about 75 percent by weight and preferably 40 to about 60 percent by weight based on the total weight of the polymer composition. The polymer compositions can be in various physical forms, such as shaped articles, for example, moldings, sheets, rods, and the like; fibers, coatings, films and fibrics, and the like.

Illustrative of the chlorinated organic compounds which may be employed are the following:

The adduct, 1,2,3,4,6,7,8,9,13,13,14,14-dodecachloro-1,4:5,6.9-trimethano- , 11H-benzo(b) fluorene, prepared by condensing two moles of hexachlorocyclopentadiene with one mole of dicyclopentadiene. The adduct has the assigned structure:

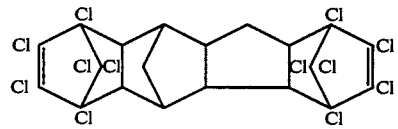

The adduct melts at about 277 to 278 degrees Celsius and has a vapor pressure of 0.044 millimeters of mercury at 197 degrees Celsius.

The adduct 1,2,3,4,5,6,7,8,10,10,11,11-dodecachloro-1,4:5,8-dimethanofluorene, prepared by condensing two moles of hexachlorocyclopentadiene with one mole of cyclopentadiene. This adduct has the assigned structure

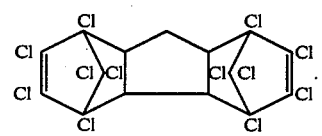

The adduct melts at about 319 to 322 degrees Celsius and has a vapor pressure of 0.031 millimeters of mercury at 197 degrees Celsius.

The adduct 1,2,3,4,5,6,7,8,12,12,13,13- dodecachloro-1,4:5,8:9,10-trimethano-anthracene is prepared by condensing one mole of the Diels-Alder adduct of cyclopentadiene and acetylene with two moles of hexachlorocyclopentadiene. The resulting adduct has the assigned structure:

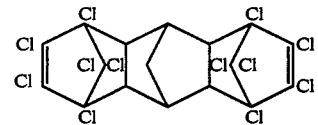

This adduct melts at about 340 degrees celsius and has a vapor pressure of 0.008 millimeters of mercury at 197 degrees Celsius.

The adduct, 1,2,3,4,5,6,7,8,9,10,10,11,11-dodecachloro-1,4,4a,-5a,6,9,9a,9b-octahydro-1, 4:6,9-dimethanodibenzofuran, prepared by condensing two moles of hexachlorocylcopentadiene and one mole of furan has the assigned structure

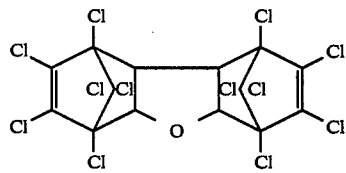

This adduct has a melting point of about 293 degrees Celsius. For convenience, this compound will be referred to by the shorter title of bis(hexachlorocyclopentadieno)furan.

The chlorinated organic compounds employed in the flame retardant compositions of this invention represent a known class of halogenated organic flame retardant compounds and are disclosed in further detail in U.S. Pat. No. 3,403,036 to Hindersinn et al. and U.S. Pat. No. 3,687,983 to Dever et al. Such compounds are typically prepared by condensation of two moles of a halogenated cyclopentadiene and one mole of a di-unsaturated cycloaliphatic compound such as 1,5-cyclooctadiene or a di-unsaturated heterocyclic compound containing oxygen as the hetero-ring atom constituent, such as furan.

The preferred chlorinated organic component of the flame retardant compositions of this invention is a Diels-Alder adduct of chlorinated cyclopentadiene and 1,5-cyclooctadiene having a melting point of about 350 degrees Celsius, a vapor pressure of about 0.006 millimeters of mercury at 197 degrees Celsius and a chlorine content of at least about 65 percent. Suitable compounds are described in detail in U.S. Pat. Nos. 3,4310,036 and 4,000,114, the disclosures of which are incorporated by reference herein. The compound may be prepared by adducting (Diels-Alder reaction) one mole of 1,5-cyclooctadiene and two or more moles of hexachlorocyclopentadiene, in xylene at below about 200° Celsius.

Further details regarding the preparation of this adduct, known as 1,4,7,10-dimethanocycloocta-1,2,3,4,7,8,9,10,13,13,14,14,-dodecahychloro-1,4,4a,5,6-6a,7,10,10a,11,12,12-dodecahydro(1,2,5,6)dibenzene are disclosed by Ziegler and FroitzheimKuhlhorn, Annalen, vol. 589, page 157 (1954). The adduct is characterized by the structural formula

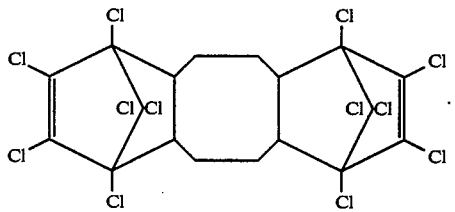

For convenience this compound will be referred to by the shorter title of bis(hexachlorocyclopentadieno)cyclooctane.

The chlorinated organic compound is typically incorporated in the compositions of this invention, in an amount of about 2 to about 50 percent by weight and preferably about 10 to about 35 percent by weight, based on the total weight of the polyolefin composition.

Various antimony compounds may be employed in the compositions of the present invention, the preferred being antimony oxide. Other suitable antimony compounds that may be employed include the sulfides of antimony, salts of the alkali metals of Group 1 of the Periodic Table, antimony salts of organic acids and their pentavalent derivatives and the esters of antimonius acids and their pentavalent derivatives. It is convenient to use sodium antimonite or potassium antimonite when it is desired to use an alkali metal salt of the antimony for compositions of this invention. U.S. Pat. No. 2,996,528 discloses suitable antimony salts of organic acids and their pentavalent derivatives. Compounds of this class include antimony butyrate, antimony valerate, antimony caproate, antimony heptylate, antimony caprylate, antimony pelargonate, antimony caprate, antimony cinnate, antimony anisate, and their pentavalent dihalide derivatives. Likewise, the esters of antimonius acids and their pentavalent derivatives disclosed in U.S. Pat. No. 2,993,924 such as tris(n-octyl) antimonite, tris(2-ethylhexyl) antimonite, tribenzyl antimonite, tris(betachloroethyl) antimonite, tris(betachloropropyl) antimonite, tris(betachloro-butyl) antimonite, and their pentavalent dihalide derivatives. Still other suitable organic antimony compounds are the cyclic antimonites such as trimethylol propane antimonite, pentaerythritol antimonite and glycerol antimonite. The antimony compound is employed in the polyolefin compositions of this invention in the amount of about 1 to about 3 and preferably about 5 to about 25 percent by weight, based on the weight of the total composition.

Various iron compounds may be employed in the smoke suppressant compositions of this invention the preferred being ferrocene. The iron component is preferably incorporated into the polyolefin composition by milling. Generally, for ease of mixing and distribution throughout the polyolefin composition, the iron component, as well as other additives, is preferably employed in the form of fine particles, such as about 0.1 to about 50 mircons. The amount of iron component may vary considerably, but is preferably in the range of about 0.01 to about 3.0 and most preferably about 0.05 to about 0.3 weight percent based on the total weight of the polyolefin composition. Among the wide variety of iron compounds that may be employed are included, for example, ferric sulfate, ferric acetate, ferric formate, ferric borate, ferric tungstate, ferric vanadate, ferric molybdate, ferrous tungstate, ferric oxalate, ferric ferrocyanide, ferric chloroendate, ferric hexachloronobronene carboxylate, ferrous hydroxide, ferrous sulfate, ferrous tartrate, ferrous stannate, ferrous chloride, ferrous ammonium sulfate, and the like.

Other iron compounds useful in the compositions of this invention are the metal or metalloxy beta-ketoenolates of the formula:

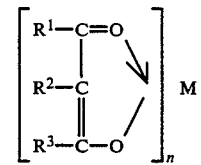

in which M is an iron ion, an ironoxy ion, or an iron hydroxy ion, in which n is an integer equal to the valence of the iron, ironoxy ion or iron hydroxy ion, in which each of $R^1$ and $R^3$ is a substituent selected from the group consisting of hydrogen and an organic substituent selected from alkyl, aryl, cycloalkyl, aralkyl, alkaryl, alkoxy, and aryloxy having one to eight carbon atoms and wherein each aryl substituent is carbocyclic, and in which $R^2$ is selected from the group consisting of $R^1$, $R^2$, halogen, nitro, and sulfo. Typical beta-ketoenolates are the ferrous or ferric acetylacetonates.

Other soluble iron compounds include the iron carboxylates, particularly derivatives of carboxylic acids for example of about 3 to 22 carbon atoms. Illustrative iron carboxylates are iron acrylate, iron oleate, iron naphthenate, iron stearate, iron laurate, iron linoleate, and the like.

Also useful in the compositions of the invention are the iron oxides, such as $Fe_2O_3$ (yellow and red iron oxide), $Fe_3O_4$ and $FeO$.

Other iron compounds which may have desirable fire retardant properites but which adversely affect the stability or the cure of the polymer compositions can be employed if such iron compounds are used in an inactive form such as encapsulated or reacted or complexed with another compound. Such iron compounds include, for example, ferric chloride and ferric oxychloride. These compounds can be encapsulated with gelatin or other polymeric materials and incorporated into the polyolefin composition in that form.

A wide variety of non-basic magnesium compounds may be employed in the smoke suppressant of this invention. Typical compounds include, for example, magnesium chloride, magnesium phosphate, magnesium silicate, magnesium stearate, magnesium antimonide, magnesium aluminate, magnesium borate, and the like and mixtures thereof. However, "basic" magnesium compounds, that is, compounds which form basic solutions or slurries when mixed with water, are not suitable. It has been found that such "basic" magnesium compounds interfere with the traditional halogen/antimony flame retardance. The magnesium compound may also be employed in the form of a magnesium bearing mineral, such as, spinel ($MGO.Al_2O_3$) serepentine ($3MgO.2SiO_2.2H_2O$), talc ($3MgO.4SiO_2.H_2O$), sapphire ($5MgO.6A_2O_3.2SiO_2$), bronzite (Mg, Fe)$SiO_2$, diopside (CaMg$(SiO_2)_2$), monitcellite (MgCaSiO$_4$), montmorilonite (Mg, Ca)O.$Al_2O_3$.5SiO$_2$.507 $H_2O$), and the like and mixtures thereof. The preferred magnesium compound, based on availability, effectiveness, and economic considerations, is talc. The preferred form of talc, based on effectiveness, is zinc stearate coated talc. The amount of magnesium compound may vary considerably, but is typically in the range of about 5 to about 50 and preferably about 20 to about 40 weight percent baased on the total weight of the polyolefin composition.

The following specific examples are provided to further illustrate this invention and the manner in which it may be carried out. It will be understood, however, that the specific details given in the examples have been chosen for purpose of illustration and are not to be construed as a limitation on the invention. In the examples, unless otherwise indicated, all parts and percentages are by weight and all temperatures are in degrees celsius.

EXAMPLES 1–7

A low density cross-linkable polyethylene (DYNH-1, Union Carbide Corporation) was banded on a two roll rubber mill, operated at 130°–135° C. To the banded polyethylene was added varying amounts of bis(hexachlorocyclopentadieno)cyclootane antimony oxide, dicumyl peroxide, talc, antioxidant and an iron compound. (Examples 2, 3, 5, and 6 are provided for comparative purposes. In Examples 2 and 3 other commercially available halogenated organic flame retardants were substituted for the chlorinated organic component of the present invention. In Example 5, the iron compound was omitted. In Example 6, the magnesium compound was omitted. In Example 8, both the magnesium and iron compounds were omitted.) Mixing was continued until the composition was uniform. The milled sheet was granulated and the granules compression molded at 160° C. for 0.5 hours to form plaques 6 inches square having a thickness of 0.125 inches or 0.075 inches. The plaques were tested for Oxygen Index following the procedures of ASTM-D-2863-30; and for smoke properties following the procedure of ASTM-E-662-79, with the results as shown in Table I, below.

TABLE I

| | Example | | | | | | |
|---|---|---|---|---|---|---|---|
| | 1 | 2 | 3 | 4 | 5 | 6 | 7 |
| Composition (parts by wt.) | | | | | | | |
| Cross-linkable polyethylene[1] | 47.7 | 47.7 | 47.7 | 47.8 | 47.9 | 67.9 | 68.0 |
| Bis(hexachlorocyclo-pentadieno)cyclooctane | 25.0 | — | — | 25.0 | 25.0 | 25.0 | 25.0 |
| Decabromo-diphenyl oxide | — | 16.7 | — | — | — | — | — |
| Ethylene bis tetrabromophthalimide | — | — | 16.7 | — | — | — | — |
| $Sb_2O_3$ | 5.0 | 3.3 | 3.3 | 5.0 | 5.0 | 5.0 | 5.0 |
| Talc (coated with Zinc Stearate) | 20.0 | 30.0 | 30.0 | 20.0 | 20.0 | — | — |
| Polymerized 1,2-dihydro-2,2,4-trimethyl quinoline[2] | 0.7 | 0.7 | 0.7 | 0.7 | 0.7 | — | — |
| Dicumyl peroxide | 1.4 | 1.4 | 1.4 | 1.4 | 1.4 | 2.0 | 2.0 |
| Ferrocene | 0.2 | 0.2 | 0.2 | — | — | — | — |
| Ferric oxide | — | — | — | 0.1 | — | 0.1 | — |
| Oxygen Index | 28.6 | 28.4 | 28.4 | 27.4 | 26.3 | 24.1 | 24.0 |
| NBS Smoke, Flaming, | | | | | | | |
| $D_s4$ | 260 | 594 | 501 | 263 | 299 | 449 | 623 |
| $D_{max}$ | 310 | 657 | 535 | 296 | 332 | 615 | 766 |

[1]DYNH-1, a commercially available low density polyethylene, Union Carbide Corporation.
[2]A commercially available anti-oxidant

EXAMPLES 8–19

The general procedure of Examples 1–8 was repeated with the polyolefin and other components and amounts being varied as shown in Table II, below. Example 19, utilizing a basic compound, is included for comparative purposes.

TABLE II

| | Examples | | | | | | | | | | | |
|---|---|---|---|---|---|---|---|---|---|---|---|---|
| | 8 | 9 | 10 | 11 | 12 | 13 | 14 | 15 | 16 | 17 | 18 | 19 |
| Composition (Parts by Weight) | | | | | | | | | | | | |
| Flame Retardant Cross-linkable Polyethylene[1] | 100 | — | — | — | — | — | — | — | — | — | — | — |
| Diene-modified ethylene- | — | 47.7 | — | — | — | — | — | — | — | — | — | — |

TABLE II-continued

| | Examples | | | | | | | | | | | |
|---|---|---|---|---|---|---|---|---|---|---|---|---|
| | 8 | 9 | 10 | 11 | 12 | 13 | 14 | 15 | 16 | 17 | 18 | 19 |
| propylene copolymer[2] | | | | | | | | | | | | |
| Ethylene-ethyl acrylate copolymer[3] | — | — | 47.7 | — | — | — | 47.7 | 50.7 | 53.7 | — | — | — |
| Polyethylene vinyl acetate[4] | — | — | — | 47.7 | 47.7 | 50.7 | — | — | — | 47.7 | 47.7 | 47.7 |
| Bis(hexachlorocyclopentadieno)cyclooctane | — | 25.0 | 25.0 | 25.0 | — | — | — | — | — | 25.0 | 25.0 | 25.0 |
| Bis(hexachlorocyclopentadieno)furan | — | — | — | — | 25.0 | 22.5 | 25.0 | 22.5 | 20.0 | — | — | — |
| $Sb_2O_3$ | — | 5.0 | 5.0 | 5.0 | 5.0 | 4.5 | 5.0 | 4.5 | 4.0 | 5.0 | 5.0 | 5.0 |
| Talc (coated with Zinc Stearate) | — | 20.0 | 20.0 | 20.0 | 20.0 | 20.0 | 20.0 | 20.0 | 20.0 | — | — | — |
| Talc (uncoated) | — | — | — | — | — | — | — | — | — | 20.0 | — | — |
| Anhydrous Magnesium Sulfate | — | — | — | — | — | — | — | — | — | — | 20.0 | — |
| Magnesium Carbonate | — | — | — | — | — | — | — | — | — | — | — | 20.0 |
| Ferrocene | — | 0.2 | 0.2 | 0.2 | 0.2 | 0.2 | 0.2 | 0.2 | 0.2 | 0.2 | 0.2 | 0.2 |
| Polymerized 1,2-dihydro-2,2,4-trimethyl quinoline | — | 0.7 | 0.7 | 0.7 | 0.7 | 0.7 | 0.7 | 0.7 | 0.7 | 0.7 | 0.7 | 0.7 |
| Dicumyl peroxide | — | 1.4 | 1.4 | 1.4 | 1.4 | 1.4 | 1.4 | 1.4 | 1.4 | 1.4 | 1.4 | 1.4 |
| Oxygen Index | 28.0 | 27.9 | 27.1 | 27.5 | 30.5 | 28.8 | 30.2 | 29.2 | 28.9 | 29.6 | 28.2 | 28.2 |
| NBS SMoke, Flaming | | | | | | | | | | | | |
| $D_s4$ | 318 | 370 | 151 | 216 | 291 | 292 | 253 | 246 | 272 | 375 | 396 | 523 |
| $D_{max}$ | 472 | 413 | 214 | 343 | 309 | 308 | 272 | 262 | 288 | 407 | 453 | 562 |

[1]Polycure 780, a flame retardant chemically cross-linkable polyethylene, specific gravity 1.24, commercially available from Reichhold Chemicals, Inc.
[2]Nordel 2722, a hexadiene modified ethylene propylene copolymer; specific gravity 0.88, commercially available from E. I. duPont deNemours & Co.
[3]Bakelite ® DPD-6169 ethylene-ethyl acrylate copolymer commercially available from Union Carbide Corporation
[4]Ultrathane ® 637, polyethylene vinyl acetate commercially available from U.S.I.

What is claimed is:

1. A flame retardant polymer composition comprising, in percent by weight, (1) about 25 to about 75 percent of a polyolefin, (2) about 0.01 to about 3.0 percent of a compound of iron (3) about 1 to about 30 percent of a compound of antimony, (4) about 5 to about 50 percent of a non-basic compound of magnesium, and (5) about 2 to about 50 percent of a chlorinated organic compound of the formula wherein Z is a tetravalent saturated cyclic radical having at least 4 carbon atoms which may be substituted by chlorine, bromine, fluorine or alkyl of 1 to 6 carbon atoms.

2. A flame retardant polymer composition according to Claim 1 wherein the chlorinated organic compound is of the formula 3. A composition according to claim 1 wherein the compound of iron is ferric oxide.

4. A composition according to claim 1 wherein the compound of iron is ferrocene.

5. A composition according to claim 1 wherein the compound of antimony is antimony trioxide.

6. A composition according to claim 1 wherein the compound of magnesium is talc.

7. A composition according to claim 1 wherein the polyolefin is polyethylene.

8. A composition according to claim 1 wherein the polyolefin is a copolymer of ethylene and ethyl acrylate.

9. A composition according to claim 1 wherein the polyolefin is a copolymer of ethylene and vinyl acetate.

10. A composition according to claim 1 wherein the polyolefin is a copolymer of ethylene and propylene.

11. A composition according to claim 2 wherein the compound of antimony is antimony trioxide.

12. A composition according to claim 11 wherein the compound of iron is ferric oxide.

13. A composition according to claim 11 wherein the compound of iron is ferrocene.

14. A composition according to claim 11 wherein the compound of magnesium is talc.

15. A composition according to claim 11 wherein the polyolefin is polyethylene.

16. A composition according to claim 11 wherein the polyolefin is a copolymer of ethylene and ethylacrylate.

17. A composition according to claim 11 wherein the polyolefin is a copolymer of ethylene and vinyl acetate.

18. A composition according to claim 11 wherein the polyolefin is a copolymer of ethylene and propylene.

19. A composition according to claim 14 wherein the talc is coated with zinc stearate.

20. A composition according to claim 1 wherein the chlorinated organic compound is of the formula 21. A composition according to claim 20 wherein the compound of antimony is antimony trioxide.

22. A composition according to claim 21 wherein the compound of magnesium is talc.

23. A composition according to claim 21 wherein the compound of iron is ferrocene.

24. A composition according to claim 11 comprising, in percent by weight, about 2.0 to about 50 percent of said chlorinated organic compound, about 1.0 to about 30 percent of antimony oxide, about 0.01 to about 3.0 percent ferrocene, about 5.0 to about 50 percent of talc, and about 25 to about 75 percent of polyolefin.

* * * * *